US 6,659,761 B2

(12) United States Patent
Persson

(10) Patent No.: US 6,659,761 B2
(45) Date of Patent: Dec. 9, 2003

(54) SLIDER MECHANISM

(75) Inventor: Lars Persson, Kristianstad (SE)

(73) Assignee: Nolato AB, Torekov (SE)

( * ) Notice: Subject to any disclaimer, the term of this patent is extended or adjusted under 35 U.S.C. 154(b) by 15 days.

(21) Appl. No.: 10/034,248

(22) Filed: Jan. 3, 2002

(65) Prior Publication Data

US 2003/0068405 A1 Apr. 10, 2003

(30) Foreign Application Priority Data

Oct. 10, 2001 (SE) ............................................. 0103379

(51) Int. Cl.$^7$ ............................................. B29C 45/44
(52) U.S. Cl. ................. 425/577; 425/468; 425/DIG. 5; 425/DIG. 10; 425/DIG. 58
(58) Field of Search ................ 425/468, 547, 425/DIG. 5, DIG. 10, DIG. 58, 564, 565, 566

(56) References Cited

U.S. PATENT DOCUMENTS 4,834,294 A * 5/1989 Herzog ........................ 425/564

2002/0028266 A1 * 3/2002 Babin ........................ 425/564

FOREIGN PATENT DOCUMENTS

| EP | 0 370 142 | 5/1990 |
| JP | 7171864 | 7/1995 |
| JP | 11291298 | 10/1999 |
| JP | 2000102953 | 4/2000 |

* cited by examiner

Primary Examiner—Tim Heitbrink
(74) Attorney, Agent, or Firm—Burns, Doane, Swecker & Mathis, L.L.P.

(57) ABSTRACT

A slider mechanism (1) for an injection mould comprising a core (5) which is insertable into a cavity (20) defined by mould halves (12) of the mould. The slider mechanism (1) has a body (2) which supports the core (5). The invention is characterised by a drive device (3), and a connection (4) between said body (2) and said drive device (3). The connection (4) is adapted to convert a rotary motion of the drive device (3) into a translational motion of the body (2). The invention also concerns an injection mould comprising such a slider mechanism as well as the actual slider.

17 Claims, 4 Drawing Sheets

SLIDER MECHANISM

FIELD OF THE INVENTION

The present invention relates to a slider mechanism for an injection mould comprising a core which is insertable into a cavity defined by mould halves of the mould, said slider mechanism having a body which supports said core. The invention also relates to an injection mould comprising such a slider mechanism as well as the actual slider.

BACKGROUND ART

Sliders are used in, for instance, injection moulds to form openings and depressions which have an axial extent other than the parting direction of the mould. By parting direction is meant the direction in which the mould halves of the mould are moved apart. Designers of injection moulded components learn at an early stage that, to the utmost possible extent, components are to be designed so that all openings and depressions in the material have an axial extent which coincides with the parting direction of the mould. If the component must be formed with such openings and depressions, the designer should try to ensure that they are at least arranged in one and the same direction perpendicular to the parting direction. The reason for this is that the mould would otherwise be quite complicated since it must be provided with sliders. A complicated mould is expensive to make, which in turn affects the unit price of-the completed components. As a consequence, the design of the component will to some extent be adjusted to the mould and not vice versa.

Slider mechanisms and the guiding thereof can be provided in various ways. A common way is to employ cooperation between the two mould halves of the mould. One mould half comprises an angled pin. The other mould half comprises a holder which is axially movable in the axial extent of the opening and has a core corresponding to the geometry of the opening at its end adjacent the cavity. The holder also has a bore which is intended to engage the pin of the first mould half. When the two mould halves have been joined to form a closed cavity, the pin engages in the bore, whereby the holder is moved sideways and into the core in the cavity. Correspondingly, the holder is moved back and moves the core out of the cavity as the mould halves are being divided. This concept is frequently used but is associated with a number of difficulties. The slider mechanism functions by cooperation between the two mould halves, which means that in the cases where the mould comprises a plurality of sliders, their motion must be coordinated on the one hand relative to each other, and on the other, with the motion of the two mould halves. It will be still more difficult in the cases where both mould halves must have sliders. The above described typical slider mechanism thus causes huge problems in the construction of moulds and above all in the fitting of the moulds. Also the maintenance of moulds is rendered difficult.

All these arguments recoil on the designer designing the component and restrict his creativeness. Thus there is a great need for simplified slider mechanisms.

OBJECTS OF THE PRESENT INVENTION

An object of the present invention is to provide a slider mechanism for injection moulds which is easy to make and integrate into a mould independently of the extent of the opening.

Another object of the invention is that the slider mechanism should be dependent on one mould half only or even be independent of a mould half.

One more object of the invention is that one and the same drive source should be able to drive a plurality of slider mechanisms.

SUMMARY OF THE INVENTION

According to an aspect of the present invention, a slider mechanism for an injection mould is provided, comprising a core which is insertable into a cavity defined by mould halves of the mould, the slider mechanism having a body which supports the core. The slider mechanism includes a drive means, and a connection between the body and the drive means, the connection being adapted to convert a rotary motion of the drive means into a translational motion of the body.

The invention thus provides a slider mechanism which as regards its design is very simple and thus easy to make as well as to integrate into the injection mould. The motion of the slider mechanism is only dependent on the conversion of the rotary motion of the drive means into the translational motion of the body and is that independent of the relative motion of the mould halves, which simplifies mould construction and mould fitting. This in turn reduces the mould cost and, in the end, the unit price for the components produced. Further the slider mechanism is independent of the extent of the opening or the depression that is to be formed. Thus the slider mechanism gives the designer increased possibilities of designing components as desired.

All the parts included in the slider mechanism in addition to the actual core are standard components which are not unique to the individual injection mould. The geometry of the core, however, is adjusted to, among other things, the wall thickness of the injection moulded component as well as the geometry of the opening/depression that is to be formed in the component. Once the geometry of the core is established, the core can be machined directly from the body.

According to a preferred embodiment, the connection comprises an elongate hole or groove in the body and a pin eccentrically arranged on a rotatable shaft of the drive means and engaging in said hole or groove.

Thus the slider mechanism utilises an eccentric motion, which means that the motion and stroke of the core are regulated by the eccentricity of the pin and the length of the hole or groove. It is preferred for the hole or groove to extend in a transverse direction relative to the direction of the translational motion.

It is also preferred for the drive means to be directly or indirectly rotatably connected to a drive source and for the connection therebetween to be arranged by means of belt, gear or chain drive. The selection between direct or indirect connection between the drive means and the drive source is dependent on, for instance, the number of slider mechanisms in the mould and the positioning of the slider mechanisms. In order to minimise the length and simplify, for instance, the extent of the chain it is often convenient to arrange an input drive shaft for the mould half to transmit the force between the drive source and the individual drive means. This input shaft can in turn be connected to the drive source, for instance, by means of a gear rack. By using an input drive shaft for each mould half, one drive source can drive a plurality of cavities.

In a preferred embodiment, the body comprises a hinge means to enable a translational motion that is not orthogonal to the rotary shaft of the drive means. The hinge means can in its simplest embodiment be resembled to a hinge that renders it possible to easily form openings/depressions in the component having a longitudinal axis that is not orthogonal to the parting direction of the mould halves.

It is further preferred for the body to have guide faces to achieve guiding of its translational motion during insertion into the mould. The guide faces are in their simplest embodiment quite plane and cooperate with corresponding recesses in the mould. The body will thus slide back and forth in the recess during its translational motion and thus obtain a stable rectilinear motion.

In a preferred embodiment, the body comprises more than one drive means. Since the body can be of different sizes, it may be necessary for it to have a plurality of drive means on the one hand to cause a more controlled motion and, on the other hand, to cause a sufficiently propagated force against the moulding pressure in the cavity.

According to another aspect, the invention comprises an injection mould having a cavity defined by mould halves, in which one of the mould halves comprises at least one slider mechanism, said slider mechanism comprising a body which supports a core which is insertable into the cavity and a drive means which via a connection is connected to the body. The injection mould is characterised in that the connection is adapted to convert a rotary motion of the drive means into a translational motion of the body.

Preferably the drive means is arranged in a channel of the mould half, the end of the drive means facing away the cavity being directly or indirectly rotatably connected to a drive source. One and the same drive source can drive a plurality of slider mechanisms with mutually different axial translational directions. The drive source can also be used to drive slider mechanisms in other cavities as well as to drive the mould halves.

In a preferred embodiment, the rotatable connection between the drive means and the drive source is arranged in a separate module in relation to the mould half. The injection mould can thus be made up of modules. Said separate module is mounted in direct or indirect connection to the mould half and comprises suitably an input shaft for transmission of force between the drive source and the individual drive means as well as one or more guide rollers to guide, for example, a chain between the drive means. A mould made up of modules is very advantageous since the mould will thus be smaller and easier to handle, for example, during manufacture, fitting, maintenance and exchange.

According to one more aspect, the invention comprises a slider which has a body and a core supported thereby. The slider is characterised in that the body has an elongate groove or hole. The body can be considered a standard module whose outer shape is independent of the mould into which it will be integrated. The geometry of the groove or hole, however, depends on the eccentrically arranged pin on the drive means with which the body is to cooperate. In fact, the length of the groove determines the stroke, i.e. how far into the mould cavity the core is to be inserted in each cycle.

Preferably, the core is formed integrally with the body. It is also preferred for the hole or groove to extend in a direction transversely of the longitudinal direction of the body.

With a view to making openings/depressions in the components having an axial extent other than orthogonal to the parting direction of the mould halves, the body can have a hinge means. The hinge means can be resembled to a hinge which makes the slider pivotable on a pin.

DESCRIPTION OF DRAWINGS

The invention will now be described in more detail by way of example and with reference to the accompanying drawings, which illustrate a currently preferred embodiment.

TECHNICAL DESCRIPTION

Moulds for injection moulding usually comprise two mould halves which in their joined state together define a cavity. In the cases where the component has openings or depressions which are arranged with an axial extent that coincides with the parting direction of the mould halves, cores can be arranged directly in one of the mould halves. If the opening/depression has a different axial extent, a movable core must be arranged in the mould. Otherwise undercut surfaces will be formed, which prevent ejection of the completed component.

By core is meant throughout the description a portion that is inserted into the cavity to form an opening or a depression in the component.

Figure 1:
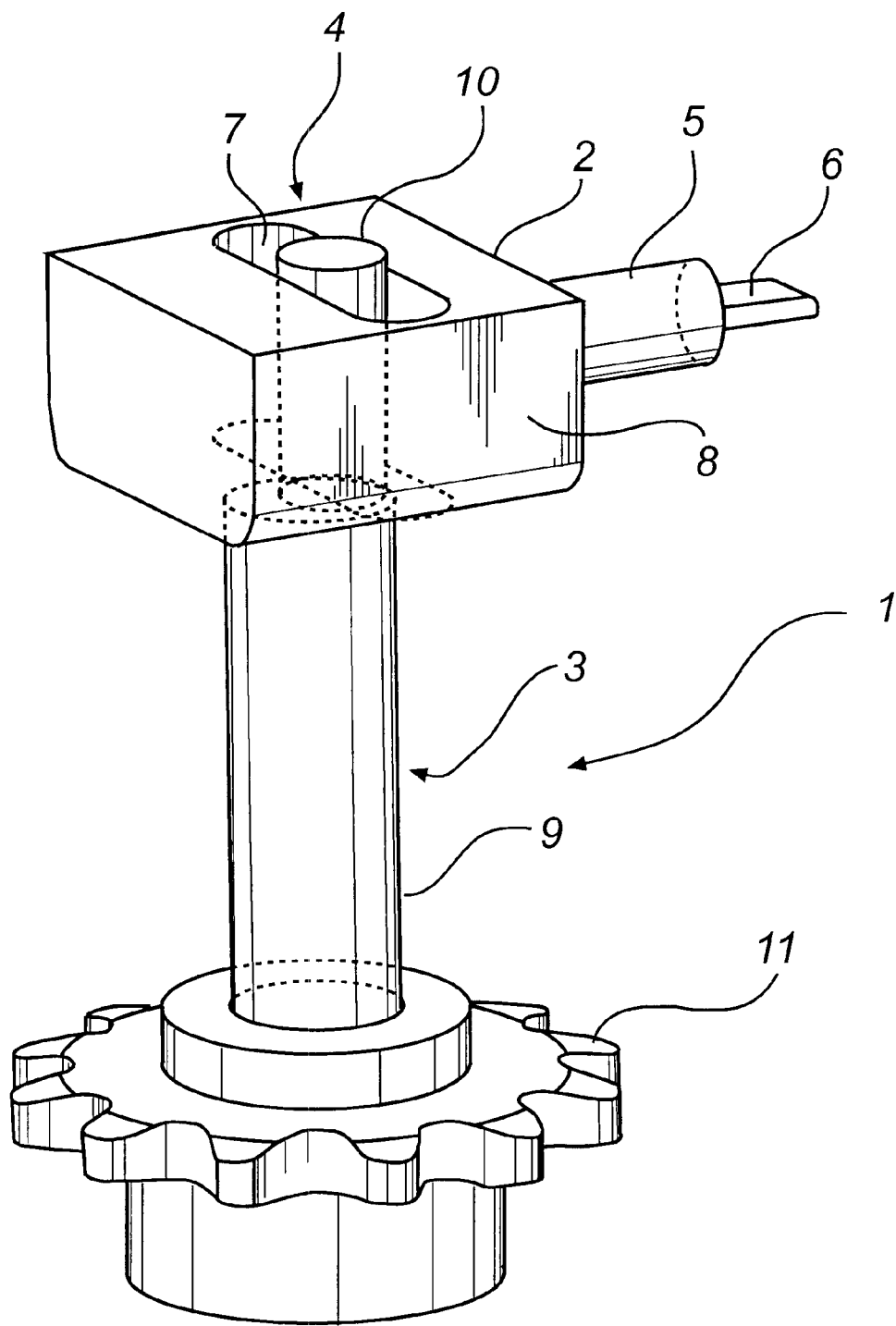
FIG. 1 shows a slider mechanism according to a preferred embodiment of the invention.

FIG. 1 shows a schematic sketch of a separate slider mechanism 1 according to the invention. The slider mechanism 1 comprises a body 2, a rotatable drive means 3 and a connection 4 between the body and the drive means 3.

The body 2 has at its end facing the cavity 20 a core 5 of a profile 6 corresponding to the desired opening/depression. The body 2 consists of a solid piece with an elongate groove 7 or hole. The groove/hole 7 is arranged with a longitudinal axis transversely of, and preferably perpendicular to, the longitudinal axis of the core. The body 2 has along its sides guide faces 8 which preferably are completely plane. The guide faces 8 are intended to abut against the complementary surfaces of body-receiving recesses in the mould half. This will be described in more detail below.

In its simplest form, the drive means 3 is a rotatable shaft 9 which at its one end has an eccentrically arranged pin 10. The pin 10 can be said to be a connection between the drive means 3 and the body 2 and is adapted to engage in the groove 7 of the body. The rotary motion of the drive means 3 is converted, by the eccentricity of the pin 10 and its cooperation with the groove 7 of the body 2, into a translational motion of the body 2.

The drive means 3 is arranged to obtain its rotary motion by a pinion 11. The pinion 11 can be designed in different ways depending on the choice of power transmission from a drive source (not shown). The power transmission can take place, for instance, by gear drive, belt drive or chain drive. The variant described below is based on chain drive, which means the pinion 11 in this case is a toothed wheel.

The slider mechanism 1 according to the present invention can be built into a mould in a number of different ways, and it will be appreciated that the way now described is merely an example.

Figure 2:
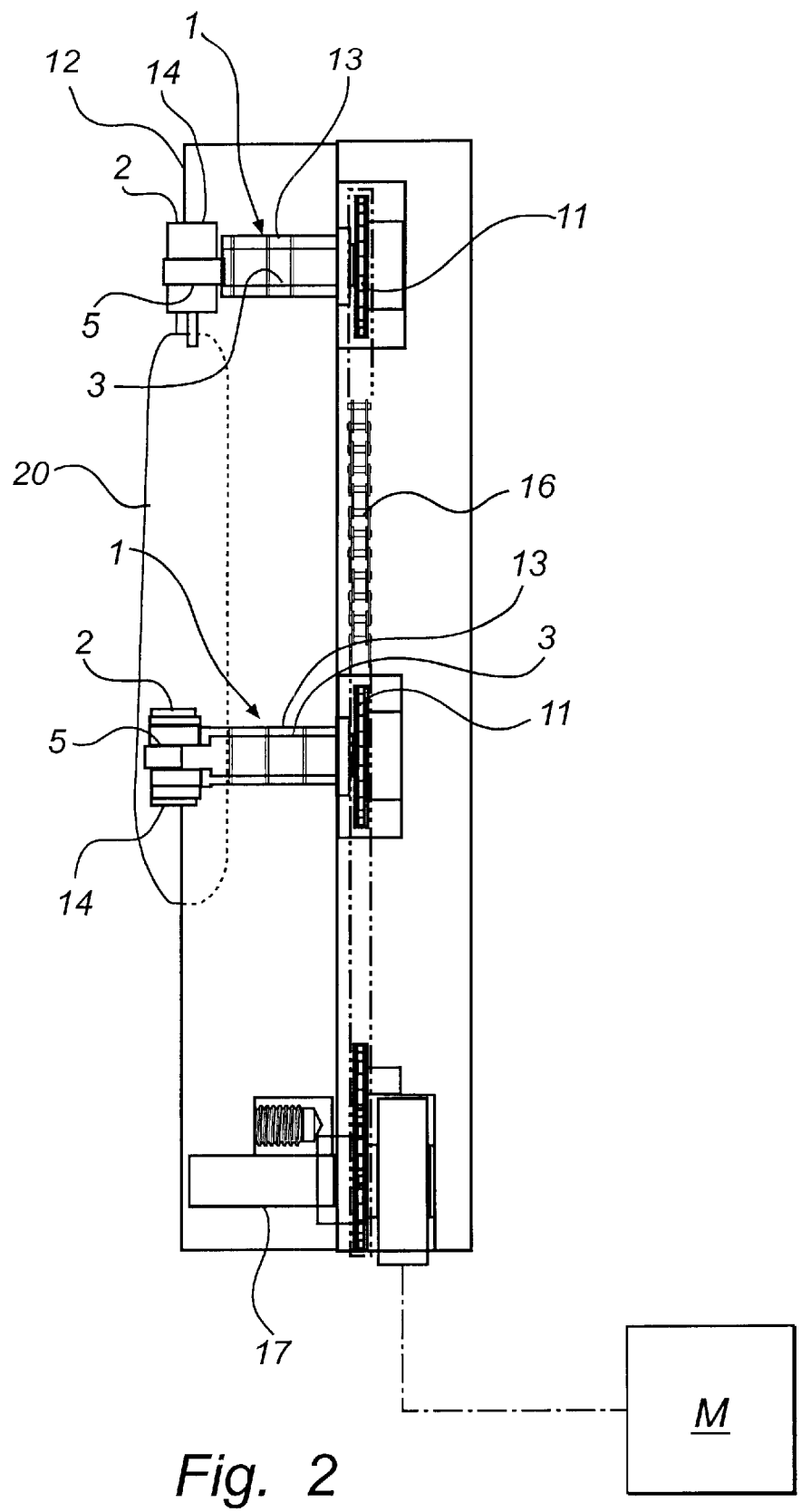
FIG. 2 is a schematic cross-sectional view of the drive of a slider mechanism which is built into a mould half.
Figure 3:
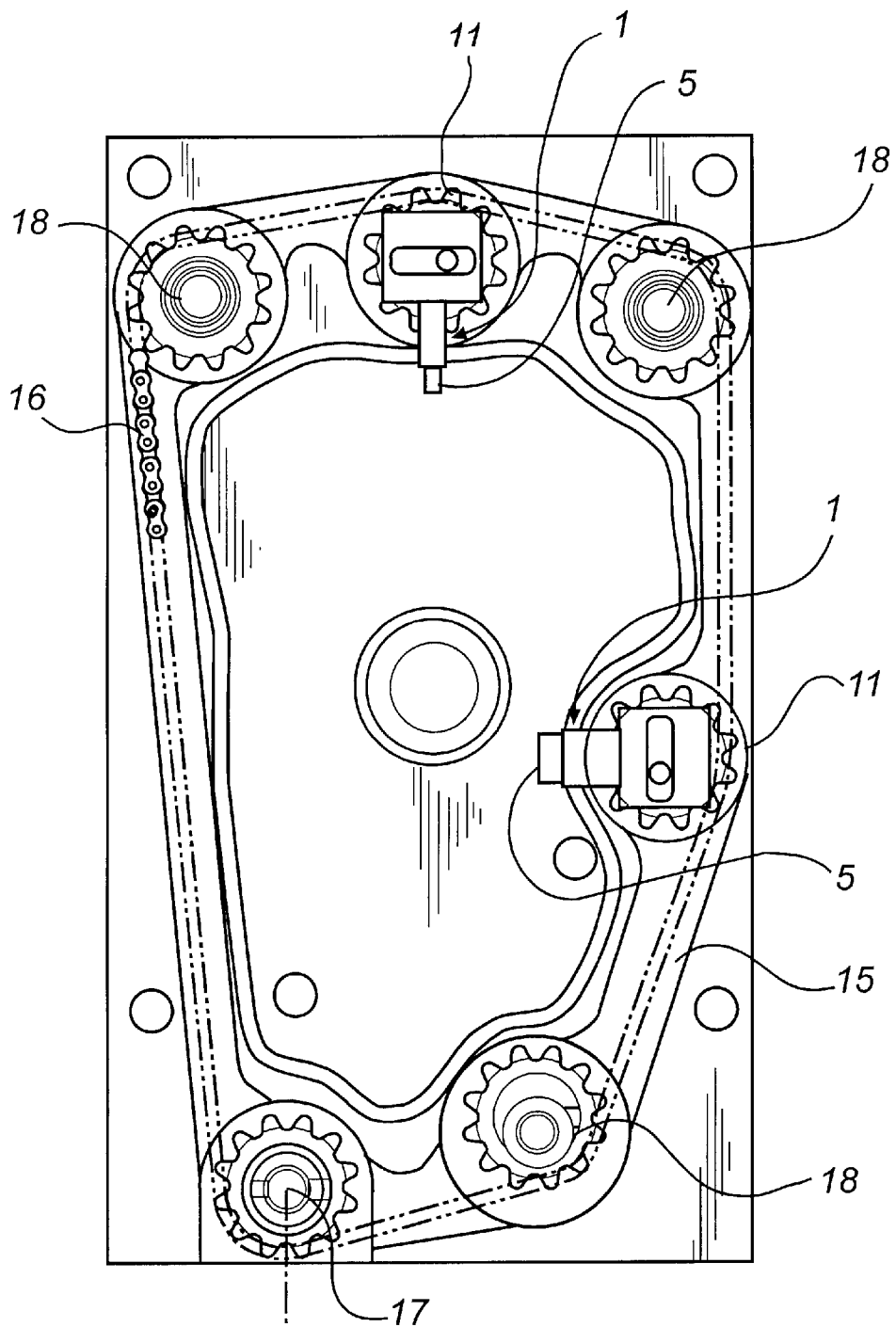
FIG. 3 is a schematic sketch of the drive of the slider mechanism according to FIG. 2 seen from the rear side of the mould half.
Figure 3:
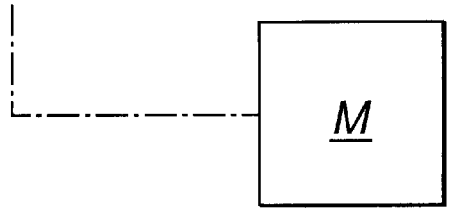

With reference to FIG. 2, a schematic cross-sectional view of a mould half 12 is shown, comprising two slider mechanisms 1 according to the present invention. The mould half 12 comprises through channels 13 for receiving the respective drive means 3, and recesses 14 for guiding the bodies 2 of the slider mechanisms 1. The recesses 14 have surfaces corresponding to the guide faces 8 of the body 2 and are intended to ensure that the body 2 is guided in the axial direction of the core 5. While referring simultaneously to FIGS. 2 and 3, depressions 15 are formed in the rear side of the mould half 12. The depressions 15 are arranged to accommodate the pinion 11 of the drive means 3 and the selected power transmission 16, i.e. the chain. The rear side of the mould half 12 further comprises an input drive shaft 17 which by means of the chain transfers the rotary motion of a drive source M to the drive means 3. The power transmission between the drive source M and the input drive shaft 17 can take place in many different ways and is not very important to the invention. An example of a suitable power transmission is by means of a gear rack (not shown) which is arranged in the base (not shown) supporting the injection mould. This solution means that the input drive shaft 17 is in this case provided with a corresponding gear wheel (not shown).

The drive source M suitably consists of the motor which also manages the relative motion of the mould halves 12. In the case where the mould comprises a plurality of cavities 20, the same drive source M can be used for all cavities 20 and their slider mechanisms.

The mould can be divided into modules (not shown). For instance the mould half can be a mould module containing the cavity 20, a through channel for the respective drive means and recesses for the body of the respective slider mechanisms. Another example of a suitable module is a drive module comprising a plate with recesses for the pinion of the drive means, the chain and the input drive shaft. The drive module is mounted in connection with the mould module. It will be appreciated that the mould may also comprise additional modules and that the drive module need not be arranged in direct connection to the mould module.

It is advantageous to divide a mould into modules since individual modules are smaller and easier to handle in connection with, for instance, mould production, mould fitting, mould exchange and mould maintenance than an ordinary ejection mould.

Figure 4:
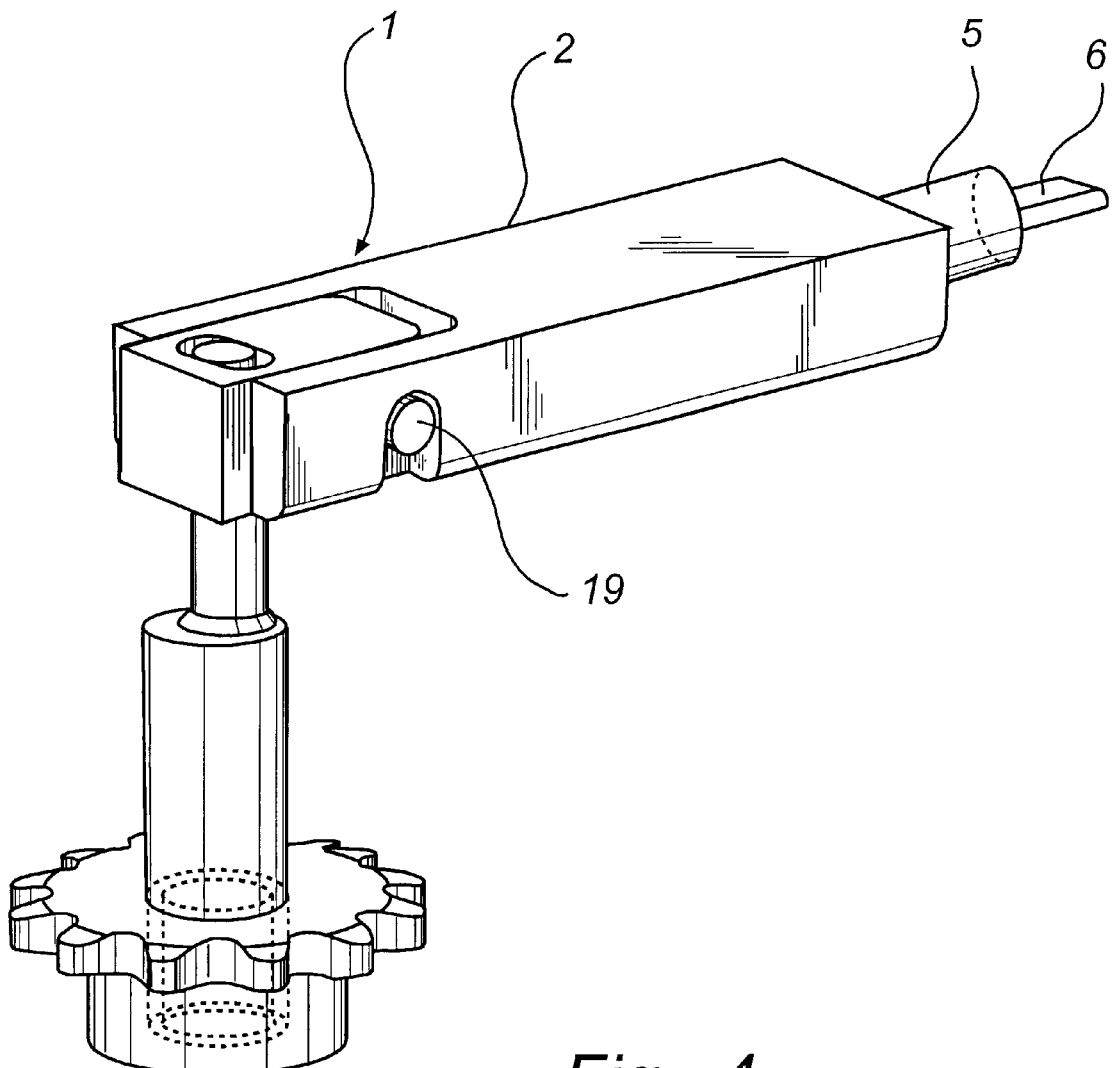
FIG. 4 shows a slider mechanism according to FIG. 1, but with a hinged body.

With reference to FIG. 4, an alternative embodiment of the body 2 is illustrated. This embodiment is appropriate to use when the opening/depression has an axial extent other than perpendicular to the parting direction of the mould halves 12. The body 2 here comprises a hinge means 19 which allows inclination of the body 2 and, thus, the axial extent of the core 5. However, it will be appreciated that the embodiment shown is merely an example of how the hinge means can be designed.

With reference to FIG. 2, the slider mechanism 1 according to the present invention thus uses an eccentric motion. When the drive source M rotates, its rotary motion is transferred by means of the input drive shaft 17 via the pinion 11 and the chain 16 to the respective drive means 3. The rotation of the drive means 3 is converted via the eccentrically arranged pin 10 and the groove 7 of the body 2 into a translational motion of the body 2 and its core 5. The translational motion of the body 2 is ensured by the body 2 being moved forwards in the recess 14. The stroke, i.e. the axial motion of the body, is adjusted by the eccentricity of the pin 10 in combination the length of the groove 7 so that the core 5 is inserted into the cavity 20 at a desired depth. The length of the groove 7 should be such that the eccentric motion is not limited. When the operating direction of the drive source M is reversed, the core 5 is moved out of the cavity 20 by a corresponding course of events. However, it is not necessary to reverse the operating direction of the drive source M in order to return the core 5, but this takes place also in a continuous rotation of the drive means 3.

The above-described power transmission is very advantageous since it enables the slider mechanisms 1 of a plurality of mould halves 12 to be connected in series, so that only one drive source M is required. Besides this is independent of the axial extent of the cores 5. At the same time the drive source M can also be used to control the motion of the mould halves 12.

Using an eccentrically controlled slider mechanism 1 is very advantageous since the motion of the core 5 will be sinusoidal. In the end positions, the acceleration and the retardation are zero so as then to increase to a maximum, which gives a very smooth motion of the core 5. This can be compared with slider mechanisms according to the prior-art type described by way of introduction, which has a relatively jerky pattern of motions.

The eccentric motion also means that the force is infinite in the end positions, which prevents a melt from undesirably penetrating between the core 5 and the cavity 20 in the cases where a through opening is to be formed in the component. This prevents the forming of flashes.

When necessary, a slider mechanism 1 may comprise two drive means 3 and, thus, also two grooves 7 or holes. This is advantageous in the case where the body 2 is large and where a controlled motion is required. The solution distributes the force more evenly over a surface, which can be advantageous when it is crucial to counteract the pressure in the cavity 20, for example, in order to counteract the forming of flashes.

Summing up the invention provides a slider mechanism 1, the design of which is very simple and whose motion merely depends on one mould half 12. The motion can even be quite independent of the motion of the mould half 12. The slider mechanism 1 is thus easy to integrate into a mould, which simplifies the fitting of the mould significantly. The slider mechanism 1 can be used independently of the axial extent of the opening/depression in relation to the parting direction of the mould. One and the same drive source M can control all slider mechanisms 1 in one mould half 12 independently of the different axial extents of the openings/depressions. Besides, standard components can be used to the greatest possible extent, which minimises the need for mould-specific solutions. A simplified making of moulds finally causes a less expensive unit price of the components. In other words, the invention makes it possible for the designer to position, practically freely, openings/depressions in the component without having to take any consequences that may make the production of moulds more expensive into consideration.

It will be appreciated that the present invention is not limited to the shown embodiment of the inventive slider mechanism. Several modifications and variants are thus feasible, and the invention is consequently defined exclusively by the appended claims.

What is claimed is:
1. A slider mechanism for an injection mould comprising:
   a core, the core being insertable into a cavity defined by mould halves of a mould, the slider mechanism having a body which supports the core;
   a drive means, and
   a connection between the body and the drive, the connection including an elongate opening in the body and a pin eccentrically arranged on a rotatable shaft of the drive and engaging in the opening, the connection being adapted to convert a rotary motion of the drive into a translational motion of the body.

2. A slider mechanism as claimed in claim 1, wherein the opening extends in a transverse direction relative to the direction of the translational motion.

3. A slider mechanism as claimed in claim 1, wherein the drive is directly or indirectly rotatably connected to a drive source.

4. A slider mechanism as claimed in claim 3, wherein the rotatable connection between the drive and the drive source is arranged by means of a belt, gear or chain drive.

5. A slider mechanism as claimed in claim 1, wherein the body comprises a hinge to enable a translational motion that is not orthogonal to the rotary shaft of the drive.

6. A slider mechanism as claimed in claim 1, wherein the body has guide faces to achieve guiding of its translational motion during insertion into the mould.

7. A slider mechanism as claimed in claim 1, comprising more than one drive.

8. An injection mould comprising:

a cavity defined by mould halves, wherein one of the mould halves comprises at least one slider mechanism, the slider mechanism comprising a body which supports a core which is insertable into the cavity and a drive which via a connection is connected to the body, the connection comprising an elongate opening in the body and a pin eccentrically arranged on a rotatable shaft of the drive and engaging in the opening, the connection being adapted to convert a rotary motion of the drive into a translational motion of the body.

9. An injection mould as claimed in claim 8, wherein the drive is arranged in a channel of the mould half, the end of the drive facing away from the cavity being directly or indirectly rotatably connected to a drive source.

10. An injection mould as claimed in claim 9, wherein the drive source can drive a plurality of slider mechanisms with mutually different axial translational directions.

11. An injection mould as claimed in claim 9, wherein the rotatable connection between the drive and the drive source is arranged by means of a belt, gear or chain drive.

12. An injection mould as claimed in claim 9, wherein the rotatable connection between the drive and the drive source is arranged in a separated module in relation to the mould half.

13. An injection mould as claimed in claim 9, wherein the rotatable connection between the drive and the drive source (M) is arranged by means of a belt, gear or chain drive.

14. An injection mould as claimed in claim 10, wherein the rotatable connection between the drive and the drive source is arranged by means of a belt, gear or chain drive.

15. An injection mould as claimed in claim 11, wherein the rotatable connection between the drive and the drive source is arranged in a separated module in relation to the mould half.

16. An injection mould as claimed in claim 10, wherein the rotatable connection between the drive and the drive source is arranged in a separated module in relation to the mould half.

17. An injection mould as claimed in claim 11, wherein the rotatable connection between the drive and the drive source is arranged in a separated module in relation to the mould half.

* * * * *